(12) United States Patent
Shimizu et al.

(10) Patent No.: US 8,712,310 B2
(45) Date of Patent: Apr. 29, 2014

(54) IMAGE FORMING APPARATUS AND CONTROL METHOD THEREFOR

(75) Inventors: Yoshiyuki Shimizu, Kanagawa (JP); Takafumi Miyazaki, Kanagawa (JP); Kozo Yamazaki, Tokyo (JP); Hideyuki Masumoto, Kanagawa (JP); Tatsuya Miyadera, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 587 days.

(21) Appl. No.: 12/457,921

(22) Filed: Jun. 25, 2009

(65) Prior Publication Data
US 2009/0324263 A1 Dec. 31, 2009

(30) Foreign Application Priority Data

Jun. 25, 2008 (JP) .................................. 2008-166117

(51) Int. Cl.
*G03G 15/00* (2006.01)
(52) U.S. Cl.
USPC ........................................................ 399/363
(58) Field of Classification Search
USPC ........................................................ 399/363
See application file for complete search history.

(56) References Cited

U.S. PATENT DOCUMENTS

| | | | |
|---|---|---|---|
| 4,853,710 A | 8/1989 | Shimada et al. | |
| 5,440,379 A * | 8/1995 | Hayamizu | 399/308 |
| 5,839,019 A * | 11/1998 | Ito | 399/45 |
| 5,881,351 A * | 3/1999 | Shimotoso et al. | 399/377 |
| 6,151,057 A | 11/2000 | Yamazaki et al. | |
| 6,259,872 B1 * | 7/2001 | Fukunaga et al. | 399/107 |
| 6,731,903 B2 * | 5/2004 | Suzuki | 399/361 |
| 6,846,056 B2 * | 1/2005 | Jacobsen et al. | 347/14 |
| 7,050,731 B2 | 5/2006 | Bannai et al. | |
| 7,203,444 B2 | 4/2007 | Yamazaki et al. | |
| 7,428,400 B2 | 9/2008 | Iwakura et al. | |
| 2004/0184828 A1 | 9/2004 | Bannai et al. | |
| 2004/0240905 A1 | 12/2004 | Yamazaki | |
| 2005/0141004 A1 * | 6/2005 | Kiwada | 358/1.12 |
| 2005/0201771 A1 * | 9/2005 | Mizuno | 399/88 |
| 2006/0012837 A1 * | 1/2006 | Ishikawa | 358/474 |
| 2006/0210326 A1 | 9/2006 | Takehara et al. | |
| 2006/0210327 A1 | 9/2006 | Iwakura et al. | |
| 2006/0257176 A1 | 11/2006 | Kawasaki et al. | |

(Continued)

FOREIGN PATENT DOCUMENTS

| | | | | |
|---|---|---|---|---|
| JP | 57181559 A | * | 11/1982 | G03G 15/00 |
| JP | 59188669 A | * | 10/1984 | G03G 15/00 |

(Continued)

*Primary Examiner* — Nguyen Ha
(74) *Attorney, Agent, or Firm* — Harness, Dickey & Pierce, P.L.C.

(57) ABSTRACT

An image forming apparatus includes a dual purpose tray that accommodates a document and a transfer sheet, a document transport mechanism to transport the document from the dual purpose tray to an image reading position, an image reading mechanism disposed beneath the document transport mechanism, an image forming mechanism disposed beneath the image reading mechanism, a transfer sheet transport mechanism to transport the transfer sheet from a bifurcation point through the image reading mechanism, a sheet feeding path that bifurcates into a first transport path through which the document is transported to the image reading position and a second transport path through which the transfer sheet is transported through the image reading mechanism to an image forming position by switching a switching member in accordance with one of a type of a recording medium set on the dual purpose tray and an operation mode of the image forming apparatus.

18 Claims, 9 Drawing Sheets

(56) References Cited

U.S. PATENT DOCUMENTS

| | | |
|---|---|---|
| 2006/0268373 A1 | 11/2006 | Tatsumi et al. |
| 2007/0110458 A1 | 5/2007 | Inoue et al. |
| 2007/0147859 A1 | 6/2007 | Adachi et al. |
| 2007/0231023 A1 | 10/2007 | Miyazaki |
| 2008/0019720 A1 | 1/2008 | Kawakami et al. |
| 2008/0038024 A1 | 2/2008 | Miyadera |
| 2008/0069602 A1 | 3/2008 | Miyadera |
| 2008/0089727 A1 | 4/2008 | Shimizu et al. |
| 2008/0095559 A1 | 4/2008 | Shimizu et al. |
| 2008/0145108 A1 | 6/2008 | Yoshida et al. |
| 2008/0145122 A1* | 6/2008 | Kaneko et al. ............... 399/388 |
| 2008/0152378 A1 | 6/2008 | Yamashita et al. |
| 2008/0152408 A1 | 6/2008 | Kawakami et al. |
| 2008/0165369 A1* | 7/2008 | Goss et al. .................... 358/1.1 |
| 2008/0170868 A1 | 7/2008 | Miyadera |
| 2008/0170898 A1 | 7/2008 | Shimizu et al. |
| 2008/0199234 A1 | 8/2008 | Hagi et al. |
| 2008/0212986 A1 | 9/2008 | Miyadera |
| 2008/0226313 A1 | 9/2008 | Tsuchida et al. |
| 2008/0310893 A1 | 12/2008 | Adachi et al. |
| 2008/0310898 A1* | 12/2008 | Jo et al. ........................ 399/367 |
| 2009/0014288 A1 | 1/2009 | Miyazaki et al. |
| 2009/0016772 A1 | 1/2009 | Adachi et al. |
| 2009/0074462 A1 | 3/2009 | Yamazaki |
| 2009/0074476 A1 | 3/2009 | Miyadera |

FOREIGN PATENT DOCUMENTS

| | | | | |
|---|---|---|---|---|
| JP | 62-86344 | | 2/1987 | |
| JP | 64000578 A | * | 1/1989 | ............ G03G 15/00 |
| JP | 08-290850 | | 11/1996 | |
| JP | 10254202 A | * | 9/1998 | ............ G03G 15/00 |
| JP | 2001282055 A | * | 10/2001 | ............ G03G 21/00 |

* cited by examiner

IMAGE FORMING APPARATUS AND CONTROL METHOD THEREFOR

CROSS-REFERENCE TO RELATED APPLICATIONS

This patent specification claims priority from Japanese Patent Application No. 2008-166117, filed on Jun. 25, 2008 in the Japan Patent Office, the entire contents of which are hereby incorporated by reference herein.

BACKGROUND OF THE INVENTION

1. Field of the Invention

The present invention relates to an image forming apparatus such as a copier, a printer, and a facsimile machine, and more particularly, to an image forming apparatus in which a document feed mechanism, an image reading mechanism, and an image forming mechanism are stacked within the image forming apparatus.

2. Discussion of the Background

Typically, image forming apparatuses include a manual sheet tray in addition to a sheet cassette from which transfer sheets are fed automatically. In such image forming apparatuses, if original documents from which image data is read and the transfer sheets onto which images are formed are placed on separate trays and are transported through separate sheet feeding paths, a large space and many components are required, which is not desirable. Consequently, several approaches, described below, have been proposed to solve such a problem.

In one known image forming apparatus, in order to reduce the number of components and use space efficiently, the image forming apparatus includes a dual purpose tray on which an original document (hereinafter simply "document") as well as a transfer sheet can be manually set. Then, near the dual purpose tray, a sheet feeding path bifurcates into a document feeding path and a transfer sheet feeding path, and a sheet switching mechanism switches the sheet feeding path between them. Additionally, an image forming device that forms images on the transfer sheet is located under an image reading device that reads image data on the document, and the dual purpose tray is adjacent to and level with the image reading device.

However, in such an image forming apparatus, because the dual purpose tray is adjacent to and level with the image reading device, the configuration cannot solve the problem of how to use space efficiently in a horizontal direction.

In another known approach, an automatic document feeder (ADF) is located above a contact glass of a main body of the image forming apparatus, and the ADF can be lifted up and out of the way to expose the contact glass. Further, the ADF includes an openable/closable cover to open a transport path. When jamming of the document occurs in a transport path, the openable/closable cover is opened, removing the pressure exerted by a lifting plate.

However, in such an image forming apparatus, the number of components cannot be reduced because both a document tray and a transfer sheet tray are used.

SUMMARY OF THE INVENTION

In view of the foregoing, one illustrative embodiment of the present invention provides an image forming apparatus that includes a dual purpose tray that accommodates a document and a transfer sheet, a document transport mechanism to transport the document placed on the dual purpose tray to an image reading position of the image forming apparatus, an image reading mechanism to read an image on the document transported to the image reading position by the document transport mechanism, disposed beneath the document transport mechanism, an image forming mechanism to form the image read by the image reading mechanism on the transfer sheet, disposed beneath the image reading mechanism, a transfer sheet transport mechanism to transport the transfer sheet from a bifurcation point through the image reading mechanism to an image forming position, a sheet feeding path through which both the document and the transfer sheet are transported to the bifurcation point from the dual purpose tray, a first transport path through which the document is transported to the image reading position from the bifurcation point, a second transport path through which the transfer sheet is transported through the image reading mechanism to an image forming position from the bifurcation point, and a switching member to switch the sheet feeding path between the first transport path and the second transport path at the bifurcation point in accordance with one of a type of a recording medium set on the dual purpose tray and an operation mode of the image forming apparatus.

Another illustrative embodiment of the present invention provides a control method for the image forming apparatus described above, including the steps of: determining whether a recording medium set on the dual purpose tray is a document or a transfer sheet, transporting the document to the image reading position via the first transport path when the recording medium is the document, and transporting the transfer sheet to the image forming position via the second transport path when the recording medium is the transfer sheet.

Another illustrative embodiment of the present invention provides a control method for the image forming apparatus described above, including the steps of: determining whether an operation mode of the image forming apparatus is a scanning mode or a printing mode, and transporting the document to the image reading position via the first transport path when the operation mode is the scanning mode, or transporting the transfer sheet to the image forming position via the second transport path when the operation mode is the printing mode.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF PREFERRED EMBODIMENTS

Figure 1:
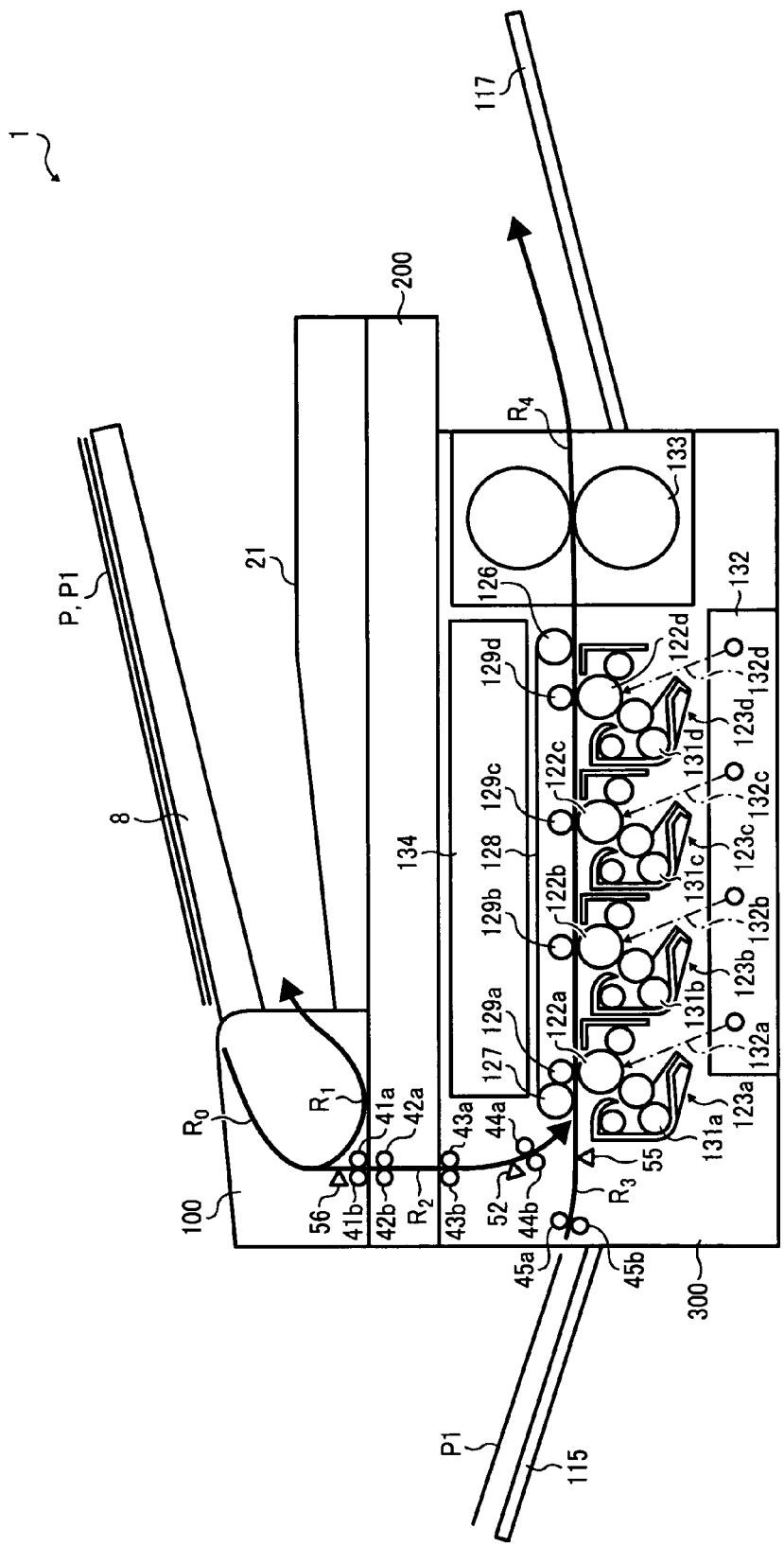
FIG. 1 is a schematic cross-sectional view illustrating a configuration of an image forming apparatus according to an illustrative embodiment of the present invention.

In describing preferred embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner and achieve a similar result.

Referring now to the drawings, wherein like reference numerals designate identical or corresponding parts throughout the several views thereof, particularly to FIG. 1, an image forming apparatus according to an illustrative embodiment of the present invention is described below.

(Configuration of Image Forming Apparatus)

FIG. 1 is a schematic diagram illustrating a configuration of an image forming apparatus 1. In FIG. 1, a dual purpose tray 8, an automatic document feeder (ADF) 100, and an image reading device (scanner) 200 are stacked on top of an image forming device 300 of the image forming apparatus 1. The ADF 100 transports an original document (hereinafter simply "document") P placed on the dual purpose tray 8 to an image reading position where the scanner 200 reads image data of the document P, and transports a transfer sheet P1 placed on the dual purpose tray 8 into the image reading device 200. The image forming device 300 that forms a main body of the image forming apparatus 1 then forms an image of the document on the transfer sheet P1 based on the image data provided by the image reading device 200 or image data sent from an external device.

Further, as operation modes, the image forming apparatus 1 has at least a sheet-through reading mode and a fixed reading mode as scanning modes, a multicolor printing mode and a monochrome printing mode as printing modes, and a manual feeding mode and an automatic feeding mode as sheet feeding modes.

In the sheet-through reading mode, the ADF 100 reads the image data of the document P while transporting the document P from the dual purpose tray 8 to the image reading position. In the fixed reading mode, the document P is fixed by a reflection plate 7 (illustrated in FIG. 3) that is provided on the bottom of the ADF 100 while the image reading device 200 moves and reads the image data from the document P.

In the multicolor printing mode, the image forming device 300 forms a multicolor image on the transfer sheet P1. In the monochrome printing mode, the image forming device 300 forms a single-color image on the transfer sheet P1. In the manual feeding mode, the transfer sheet P1 is manually fed by a user in the printing mode. In the automatic feeding mode, the transfer sheet P1 on the dual purpose tray 8 is automatically fed in the printing mode.

Figure 4:
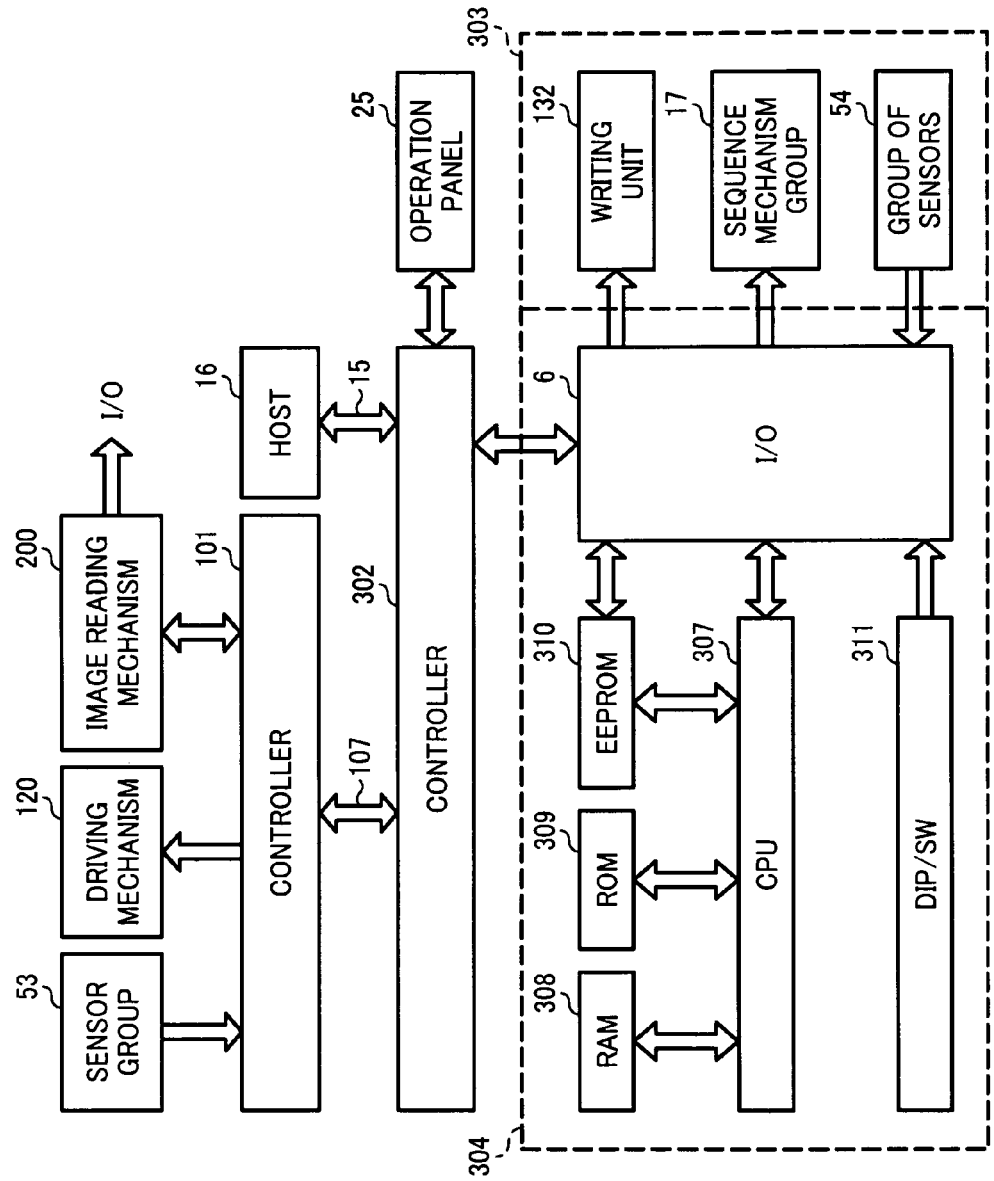
FIG. 4 is a block diagram illustrating a configuration of a control mechanism included in the image forming apparatus shown in FIG. 1.

It is to be noted that each operation mode is set using an operation panel 25 (illustrated in FIG. 4). The operation panel 25 has an operation portion including a start key and a numeric keypad, and a display portion including a liquid crystal display.

Additionally, the image forming apparatus 1 includes transport paths R0, R1, R2, R3, and R4 as shown in FIG. 1. The transport path R0, serving as a sheet feeding path, leads to a switching pawl 61 (illustrated in FIG. 3) from the dual purpose tray 8 and bifurcates into the transport paths R1 and R2 at a position of the switching pawl 61 (hereinafter also "bifurcation point"). The transport path R1, serving as a first transport path, leads from the bifurcation point to a document-discharge tray 21 through the image reading position. The transport path R2, serving as a second transport path, leads from the bifurcation point to the image forming position in the image forming device 300 through the image reading device 200. The transport path R3 leads from a manual sheet feeding tray 115 to the image forming position. The transport path R4 leads from the image forming position to a transfer sheet discharging tray 117.

The ADF 100 is connected to the image reading device 200 and the image forming device 300 via the transport path R2. Serving as transport mechanisms, a third transport roller 41a, a third driven roller 41b, guide rollers 42a and 42b, a fourth transport roller 43a, a fourth driven roller 43b, a fifth transport roller 44a, and a fifth driven roller 44b are arranged on the transport path R2. A manual feeding roller 45a and a manual feeding driven roller 45b are arranged on the transport path R3.

Figure 2:
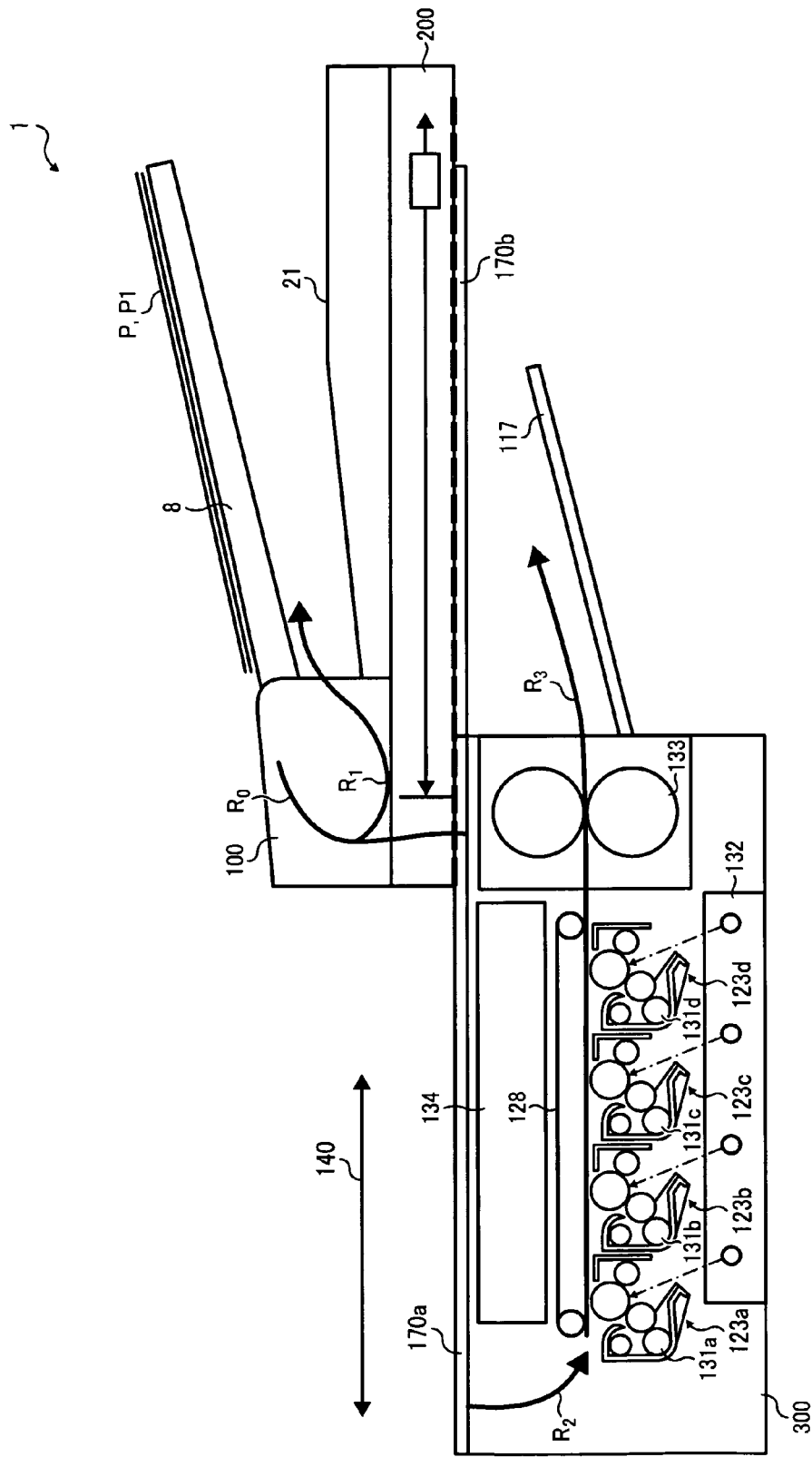
FIG. 2 is a cross-sectional view illustrating a slide direction of an image reading device included in the image forming apparatus shown in FIG. 1.

Referring to FIG. 2, the ADF 100 and the image reading device 200 can slide in a horizontal direction (indicated by double-headed arrow 140) on the image forming device 300 by slide mechanisms 170a and 170b, and thus, the top of the image forming device 300 can be exposed. The slide mechanisms 170a and 170b, serving as slide connection mechanisms, can be formed by known components such as sliding rails, wheels or bearings, and sliding plates as support members. It is to be noted that FIG. 2 shows a configuration of the image forming apparatus when the manual sheet feeding tray 115 is detached therefrom.

Figure 3:
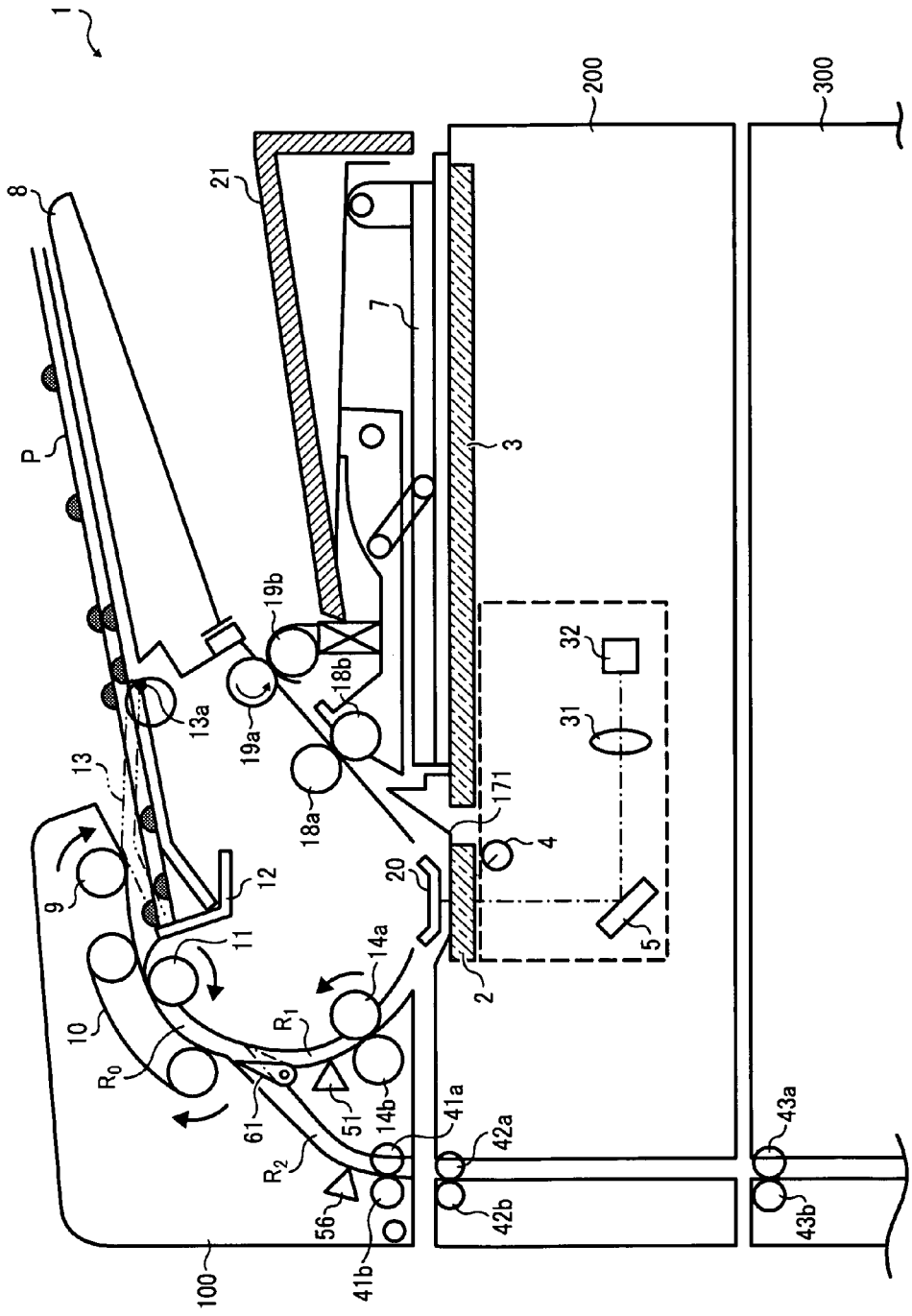
FIG. 3 is a schematic cross-sectional view illustrating a configuration of an image forming device included in the image forming apparatus shown in FIG. 1.

With reference to FIG. 3, the ADF 100 includes the switching pawl 61 that switches the transport path R0 between the transport path R1 and the transport path R2 at the bifurcation point in accordance with the type of recording medium on the dual purpose tray 8 (the document P or the transfer sheet P1) or the operation mode. The ADF 100 further includes a switching mechanism, for example, a push-type solenoid, to activate the switching pawl 61. The switching pawl 61 is at a home position indicated by a solid line shown in FIG. 3 when the switching mechanism is not activated, and the switching pawl 61 is at a printing portion indicated by a broken line shown in FIG. 3 when the switching mechanism is activated.

When the switching pawl 61 is at the position indicated by the solid line shown in FIG. 3, a recording medium on the dual purpose tray 8 is transported to the image reading position on a slit glass 2 via the transport paths R0 and R1. By contrast, when the switching pawl 61 is at the position indicated by the broken line shown in FIG. 3, the recording medium on the dual purpose tray 8 is transported to the image reading device 200 and the image forming device 300 via the transport paths R0 and R2.

Moreover, the ADF 100 is rotatably connected to the image reading device 200 by a hinge, not shown, and therefore, the ADF 100 can open with respect to the slit glass 2 and a contact glass 3. Further, beneath the ADF 100, a reflection glass 7 that presses the document P placed on the contact glass 3 toward the contact glass 3 and serves as a white standard is disposed.

The user can place a stack of the documents P or a stack of the transfer sheets P1 on the dual purpose tray 8 disposed above the ADF 100.

For example, in sheet-through reading mode, initially, the document P is set with its front surface (image surface) up on the dual purpose tray 8. As a pickup roller 9 rotates while contacting the image surface of the document P, the document P is fed to a nip portion between a sheet feeding belt 10 and a separation roller 11, which is a separation portion.

Then, while the sheet feeding belt 10 rotates in a direction to transport the document P (hereinafter "feeding direction"), the separation roller 11 receives a driving force via a torque limiter, not shown, from a drive shaft that rotates in both the feeding direction and the reverse thereto. Then, when no document P or only a single document P is in the separation portion, the separation roller 11 rotates to the feeding direction. By contrast, when two or more documents P enter the separation portion, the separation roller 11 stops rotating or begins rotating in reverse. Therefore, only a single document P is separated from the stack of the documents P by the separation roller 11 from the top and the documents P can be fed one by one.

Additionally, a stopper 12 is located downstream from the pickup roller 9 in the feeding direction. The stopper 12 prohibits the document P placed on the dual purpose tray 8 from entering the nip position between the separation roller 11 and the sheet feeding belt 10. Further, the sheet feeding belt 10 contacts and presses the separation roller 11 at a given angle θ.

As shown in FIG. 3, beneath the pickup roller 9, a lifting board 13 is located. The lifting board 13 rotates around a rotating fulcrum 13a disposed upstream in the feeding direction by a solenoid, not shown, and side of a leading edge of the lifting board 13 alternately approaches and disengages from the pickup roller 9. When a start switch on the operation panel 25 (illustrated in FIG. 4) is pushed (start operation), the lifting board 13 moves from a home position (indicated by a solid line in FIG. 3) that is away from the pickup roller 9 to a pickup position (indicated by broken lines) that is close to the pickup roller 9, and the document P is pressed to the pickup roller 9 by the lifting board 13. Therefore, due to rotation of the pickup roller 9, the document P is transported into the nip portion between the sheet feeding belt 10 and the separation roller 11.

Further, in the sheet-through reading mode, because the switching pawl 61, which is located upstream in the feeding direction, is at the home position (indicated by the solid line shown in FIG. 3), the document P that is separated one by one by the sheet feeding belt 10 and the separation roller 11 is guided from the transport path R0 to the transport path R1. Then, while being reversed in the transport path R1, the document P is transported to the slit glass 2 by a first driven roller 14b and a first transport roller 14a that is rotated by a driving roller, not shown. Above the slit glass 2, a reading guide board 20 that presses the document P toward the slit glass 2 is located and serves as a white standard when the document P is read. A registration sensor 51 that detects the presence of the document P is disposed alongside the transport path R1, upstream from the first driven roller 14b.

After the document P makes a U-turn and is transported by the first transport roller 14a and the first driven roller 14b as described above, the document P is grasped between the reading guide 20 and the slit glass 2 and passes on the slit glass 2 while being read by the image reading device 200. After that, the document P is scooped up and guided by a reverse-discharge guide 171 to a discharge path in the transport path R1.

Thereafter, the document P is sandwiched between a second transport roller 18a and a second driven roller 18b, and a document discharging roller 19a and a document discharge driven roller 19b, is transported thereby through the discharge path in the transport path R1, and then is discharged onto the document-discharge tray 21 that serves as an external cover.

A description is now given of the structure and operation of the image reading device 200.

As shown in FIG. 3, the image reading device 200 includes an exposure lamp 4, a first mirror 5, a lens 31, and an image reading element 32 such as CCD (shown within the broken line frame in FIG. 3).

In the fixed reading mode, that is, when the document P is set on the contact glass 3, by moving the exposure lamp 4 and the first mirror 5 in a horizontal direction in FIG. 3, the image surface of the document P is read from beneath the document P.

While in the sheet-through reading mode, that is, when the document P is read through the slit glass 2 while the document p is transported, the exposure lamp 4 and the first mirror 5 do not move beneath the document P when the document P is read.

Through a known method, light emitted by the exposure lamp 4 is reflected on the surface of the document P, enters the image reading element 32, such as a CCD, via the first mirror 5 and the lens 31, and forms an image. Based on the image, the image reading element 32 outputs analog image signals.

The image reading device 200 further includes an image amplification circuit, an analog-digital (A/D) convert circuit, and an image processor, although not shown. The image amplification circuit amplifies the analog image signals from the image reading element 32, and the A/D convert circuit converts the analog image signals to digital signals. Then, the image processor executes a predetermined or given image processing such as compression coding on the digital signal.

The data after image processing, that is electronic data, is accumulated on an image memory, not shown, and can be output to an external interface.

Moreover, in the image reading device 200, the transport path R2 through which the transfer sheet P1 is transported following through the ADF 100 is formed. A pair of guide rollers 24a and 24b is arranged on an entrance side of the transport path R2, in the upper portion of the image reading device 200.

For example, in the multicolor printing mode, because the switching pawl 61, which is located in the ADF 100, is moved to the printing position (indicated by broken lines in FIG. 3) by activating the solenoid, not shown, the transfer sheet P1 that is separated one by one by the sheet feeding belt 10 and the separation roller 11 is guided from the transport path R0 to the transport path R2. Then, the transfer sheet P1 is transported to the entrance of the transport path R2 in the image reading device 200 by the third driven roller 41b and the third transport roller 41a that is rotated by a driving motor, not shown. Subsequently, after the transfer sheet P1 enters the nip portion between the guide rollers 42a and 42b, the transfer sheet P1 is transported downward by rotating the third transport roller 41a in the ADF 100, namely, the transfer sheet P1 is transported to an upper portion of the image forming device 300.

As shown in FIG. 1, the image forming device 300 includes at least the manual sheet feeding tray 115, a writing unit 132, development devices 131a, 131b, 131c, 131d, a transfer unit 130, a fixing mechanism 133, and the transfer sheet discharging tray 117. The manual sheet feeding tray 115, serving as a dedicated tray, is detachably attached to the image forming device 300 and feeds the transfer sheet P1 that is manually set thereon. The writing unit 132 writes latent images based on the image data from the image reading device 200 or the external device on the photoreceptor drums 122a, 122b, 122c and 122d by laser beams 132a, 132b, 132c and 132d, respectively. The development devices 131a, 131b, 131c and 131d develop the latent images written by the writing unit 132 on the respective photoreceptor drums 122a, 122b, 122c and 122d with developers (toners), thus forming toner images thereon. The transfer unit 130 transfers the toner images formed on the photoreceptor drums 122 onto the transfer sheet P1. The fixing device 133 fixes the toner images transferred by the transfer unit 130 to the transfer sheet P1. The transfer sheet discharging tray 117 receives the transfer sheet P1 after the fixing process.

It is to be noted that, in the image forming device 300, reference character suffixes a, b, c, and d attached to an identical reference numeral indicate only that components indicated thereby are used for forming different single-color images, respectively, and hereinafter may be omitted when color discrimination is not necessary.

Although its configuration is not shown in detail in the drawings, the writing unit 132 includes a laser output mechanism that generates and emits the laser beams (light) 132a, 132b, 132c, and 132d, and a laser control mechanism that converts the image data into the emitting amount of the laser beams 132a, 132b, 132c, and 132d. Further, the four development devices 131a, 131b, 131c, and 131d that contain respective developers (four color toner) are built into image carrier units 123a, 123b, 123c, and 123d. Each image carrier unit 123 includes an electrically charging roller that contacts the photoreceptor drum 122 and a cleaning blade that removes residual toner on a circumferential surface of the photoreceptor drum 122, that is, cleans the photoreceptor drum 122.

The transfer unit 130 includes a group of rollers that includes a belt roller 126, transfer rollers 129a, 129b, 129c, and 129d that face the respective photoreceptor drums 122a, 122b, 122c, and 122d, a belt driven roller 127, and a transfer belt 128 that is a seamless belt. In the transfer unit 130, while the transfer sheet P is transported by the transfer belt 128 that winds around the group of rollers, at least one of four color toner images is transferred onto the transfer sheet P1. Above the transfer unit 130, a support frame 134 that supports the transfer unit 130 is provided in the image forming device 300.

The fixing device 133 includes a pressing roller and a heating roller that press and heat the transfer sheet P1, thereby fixing the toner image thereon, after the transfer processing. Subsequently, the cleaning blade cleans the circumferential surface the photoreceptor drum 122 as an initialization process, after which the electrically charging roller charges the circumferential surface of the photoreceptor drum 122 to a uniform high electrical potential. Then, the writing unit 132 emits the laser beam whose strength is modulated based on the image data toward the circumferential surface of the photoreceptor drum 122, thereby exposing the circumferential surface thereof selectively.

Thus, the latent image, which consists of low-voltage portions where the voltage is attenuated by exposure and high-voltage portions where the voltage is increased in the initialization process, is formed on the circumferential surface of the photoreceptor drums 122. Each development device 131 transfers the toner to either the high-voltage portion or the low-voltage portions of the latent image, forming toner images, in what is called a development process.

Meanwhile, the transfer sheet P1 is transported to the image forming position that includes nip portions between the photoreceptor drums 122 and the transfer belt 128, timed to coincide with transfer process so that the toner images are transferred onto a predetermined area of the transfer sheet P1. The above-described timing to forward the transfer sheet P1 is determined based on detection readings supplied by registration sensors 56 or 52. The registration sensor 56 and 52 are located along the transport path R2, and the registration sensor 56 is located upstream in the feeding direction and the registration sensor 52 is located upstream from the image forming position.

In the printing mode, the transfer sheet P1 on the manual sheet feeding tray 115 is inserted into a nip portion between the manual feeding roller 45a and the manual feeding driven roller 45b and is transported to the image forming position via the transport path R3 (manual feeding mode). In the manual feeding mode, a registration sensor 55 that is located along the transport path R3 upstream from the image forming position detects the presence of the document P. Alternatively, the transfer sheet P1 is picked up from the stack of the transfer sheets P1 on the dual purpose tray 8 and is transported to the image forming position via the transport paths R0 and R1 in the automatic feeding mode.

Next, the configuration of a control mechanism of the image forming apparatus 1 is described below, with reference to FIG. 4.

Referring to FIG. 4, the image forming device 300 includes a controller 302 that executes image processing, an engine 303 for image formation, an engine control board 304 that controls the engine 303, and the operation panel 25 via which the user sets the various operation modes and sends commands to the control mechanism to start operation. The controller 302 sends signals to and receives signals from the engine 303 and the engine control board 304 via an input-output (I/O) interface 6 in the engine control board 304.

Further, the engine 303 includes the writing unit 132 that includes a laser diode (LD) and a polygon motor, a sequence mechanism group 17 that controls an engine sequence for a fixing system, a developing system and a driving system, and a sensor group 54 that checks transporting conditions on the transport paths and sequence conditions.

The driving system controlled by the engine sequence group 17 includes a manual feeding motor, a belt transport motor, and a print transport motor, which are not shown. The manual feeding motor rotates the manual feeding roller 45a, the belt transport motor rotates the belt roller 126, and the print transport motor rotates the fourth transport roller 43a and the fifth transport roller 44a.

Further, the engine control board 304 includes a central processing unit (CPU) 307, a random access memory (RAM) 308, a read only memory (ROM) 309, an electrically erasable programmable read only memory (EEPROM) 310, and a dual in-line package switch (DIP/SW) 311.

The CPU 307 controls the engine entirely according to programs stored in the ROM 309, mode instructions from the operation panel 25, commands from the controller 302, or necessary information associated with the commands from the controller 302. The RAM 308 is used as a working memory for the CPU 307 or an input buffer for input data. The ROM 309 stores the control programs of the engine 303. The EEPROM 310 stores an error record of the engine 303 and contents of the mode instructions from the operation panel 25. The DIP/SW 311 sets the mode of the engine control.

Additionally, the controller 302 of the image forming device 300 is connected to a controller 101 of the ADF 100 via an interface 107. The image forming device 300 exchanges required data and control signals with the ADP 100.

Further, the controller 302 in the image forming device 300 is connected to a host computer (HOST) 16 via an I/O interface 15, and therefore, a communication system to exchange required data and control signals between the image forming device 300 and the HOST 16 is constructed.

Additionally, the controller 101 in the ADF 100 is connected to a sensor group 53 including a registration sensor 51, and a driving mechanism 120 such as the solenoid, the driving motors, and the motor drivers. The driving motors include the document feeding motor that rotates a feeding belt roller, a reading roller that rotates a first transport roller 14a, and a print feeding motor that rotates the third transport roller 41a. The motor drivers activate the mechanisms such as various rollers.

Then, based on signals from the sensor group 53 and a control signal from the controller 302, the controller 101 sends a read-timing signal to the image reading device 200 and turns on and off light sources for exposure. Because the image reading device 200 is connected to the I/O interface 6, the image reading device 200 can exchange the image data and the control signals with the engine control board 304.

Figure 5:
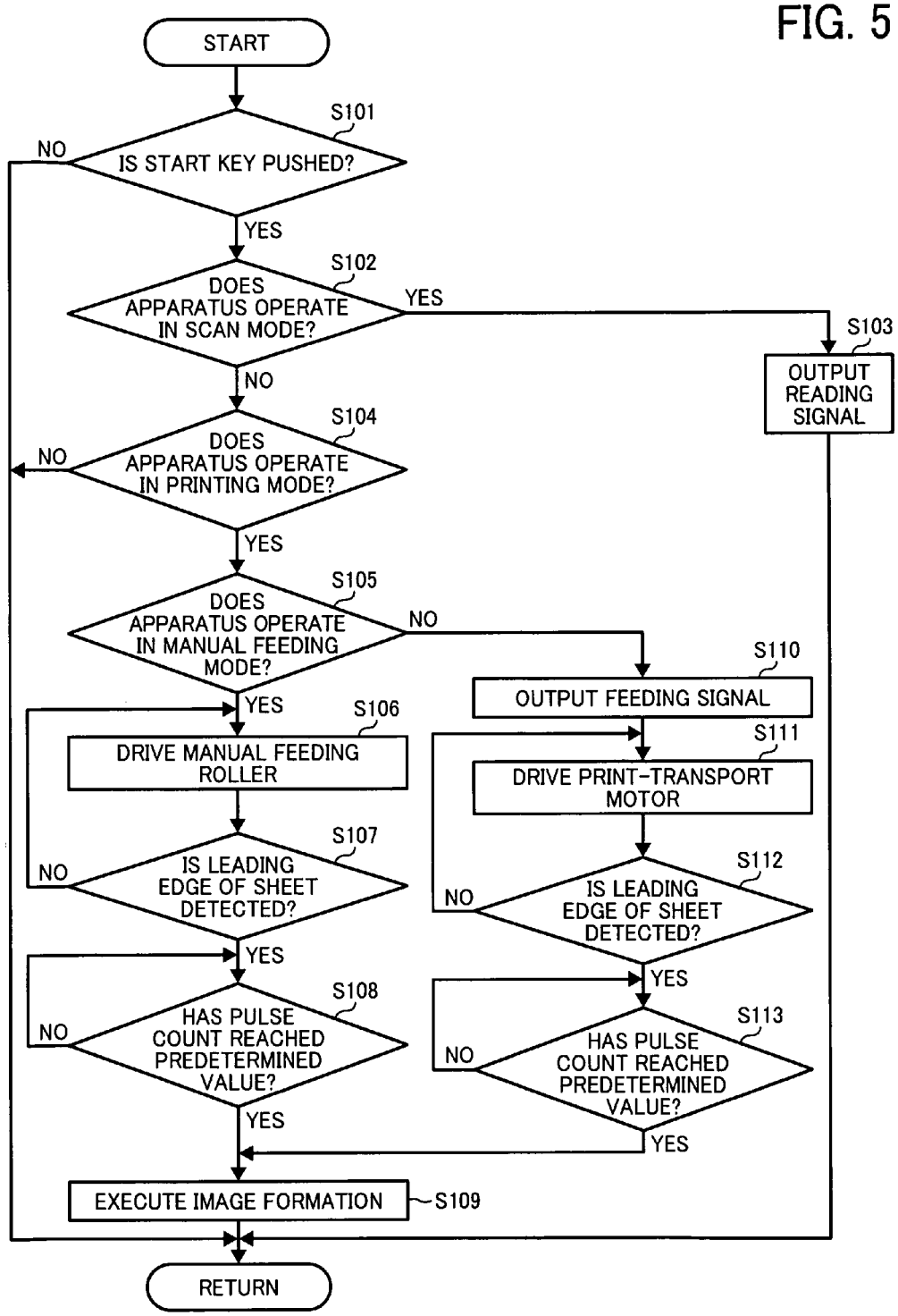
FIG. 5 is a flowchart illustrating steps in a control process of the image forming device shown in FIG. 3.

FIG. 5 is a flowchart illustrating steps in a control process executed by the image forming device 300 in the image forming apparatus 1. Referring to FIG. 5, the image forming processing is described below.

At S101, the controller 302 determines whether or not the start operation is performed. For example, whether or not the start key in the operation panel 25 shown in FIG. 4 is pushed is determined based on the signal output from the operation panel 25. At this time, when the controller 302 determines that the start switch has been pushed (YES at S101), the process proceeds to S102. By contrast, when the controller 302 determines that the start switch has not been pushed (NO at S101), the control process is finished.

At S102, the controller 302 determines whether or not the operation mode is the scanning mode. For example, the controller 302 checks whether or not information showing the sheet-through reading mode or the fixed reading mode is stored in a memory in the controller 302. At this time, when the controller 302 determines that the scanning mode is selected (YES at S102), the process proceeds to S103. By contrast, when the controller 302 determines that the operation mode is not the scanning mode (NO at S102), the process proceeds to S104.

At S103, the controller 302 outputs a reading signal to the controller 101. The reading signal is a control signal to command that the document be automatically read and transported.

At S104, the controller 302 determines whether or not the operation mode is the printing mode. For example, the controller 302 checks whether or nor information showing the single-color printing mode or multicolor printing mode is stored in the memory in the controller 302. At this time, when the controller 302 determines that the printing mode is selected, the process proceeds to S105 (YES at S104). By contrast, when the controller 302 determines that the operation mode is not the printing mode (NO at S104), the control process is finished.

At S105, the controller 302 determines whether or not the operation mode is the manual feeding mode, for example, whether or nor information showing the manual feeding mode is stored in the memory in the controller 302. At this time, when the controller 302 determines that the manual feeding mode is selected (YES at S105), the process proceeds to S106. By contrast, when the controller 302 determines that the operation mode is not manual feeding mode (NO at S105), the control process proceeds to S110.

At S106, the controller 302 activates the manual feeding motor, not shown. By activating the manual feeding motor, the manual feeding roller 45a rotates counterclockwise in FIG. 1. Then, the manual feeding roller 45a and manual feeding driven roller 45b grasp the transfer sheet P1, and the transfer sheet P1 is transported to the image forming position. Additionally, the controller 302 counts driving pulses of the manual feeding motor.

Subsequently, at S107, the controller 302 determines whether or not the registration sensor 55 has detected a leading edge of the transfer sheet P1. For example, the controller 302 checks whether or nor the registration sensor 55 has output the signal showing detection of the transfer sheet P1. At this time, when the controller 302 determines that the registration sensor 55 has detected the leading edge of the transfer sheet P1 (YES at S107), the process proceeds to S108. By contrast, when the controller 302 determines that the registration sensor 55 has not detected the leading edge of the transfer sheet P1 (NO at S107), the control process returns to S106.

At S108, the controller 302 determines whether or not the counted value of the driving pulses (that is, the number of drive pulses counted) of the manual feeding motor has reached a predetermined value. At this time, when the controller 302 determines that the pulse count of the manual feeding motor has reached a predetermined value (YES at S108), the controller 302 inputs the image data to be printed to the CPU 307 in the engine control board 304 and commands the operation of the image formation processing before the process proceeds to S109. More specifically, the image data to be printed is stored in the image memory in the image reading device 200 and is output to the CPU 307 via the I/O interface 6. Alternatively, the image data to be printed is input from the HOST 16 and is output to the CPU 307 via the I/O interface 6.

The CPU 307 causes the writing unit 132 to emit the laser beams that are optically modulated based on the image data to the circumferential surfaces of the photoreceptor drums 122, that is, to perform the exposure processing, thus forming the latent images on the circumferential surfaces of the photoreceptor drums 122. Subsequently, the CPU 307 causes the development devices 131 to transfer the toner onto the circumferential surfaces of the respective photoreceptor drums 122, and the toner images are formed thereon based on the latent images.

Further, the CPU 307 causes the transfer sheet P1 to be stopped in front of the image forming position based on the detection of the leading edge of the transfer sheet P1 by the registration sensor 55 and the pulse count of the manual feeding motor. The CPU 307 further causes the manual feeding motor to transport the transfer sheet P1 the image forming position, timed to coincide with the toner images on the respective photoreceptor drums 122 so that the toner images are transferred onto the predetermined area of the transfer sheet P1. Simultaneously, the CPU 307 starts activating the belt transport motor and rotates the belt roller 126.

By contrast, when the controller 302 determines that the operation mode is not the manual feeding mode at S105, the controller 302 outputs a feeding signal to the controller 101 at S110. The feeding signal is the signal to command that the transfer sheet P1 on the dual purpose tray 8 be transported to the image forming position through the transport paths R0 and R2.

Subsequently, at S111, the controller 302 activates the print transport motor. The print transport motor rotates the fourth transport roller 43a and the fifth transport roller 44a, and then the transfer sheet P1 transported by the guide rollers 42a and 42b in the image reading device 200 enters the nip portion between the fifth transport rollers 44a and the fifth driven roller 44b.

Subsequently, at S112 the controller 302 determines whether or not the registration sensor 52 has detected a leading edge of the transfer sheet P1, for example, the controller checks whether or nor the registration sensor 52 outputs the signal showing the transfer sheet P1 is detected. At this time, when the controller 302 determines that the registration sensor 52 has detected the leading edge of the transfer sheet P1 (YES at S112), the process proceeds to S113. By contrast, when the controller 302 determines that the registration sensor 52 has not detected the leading edge of the transfer sheet P1 (NO at S112), the process returns to S111.

At S113, the controller 302 determines whether or not the counted value of the driving pulse of the printing motor has reached a predetermined value. At this time, when the controller 302 determines that the pulse count of the manual feeding motor has reached the predetermined value (YES at S113), the process proceeds to S109, and therefore, the above-described image formation is executed.

Figure 6:
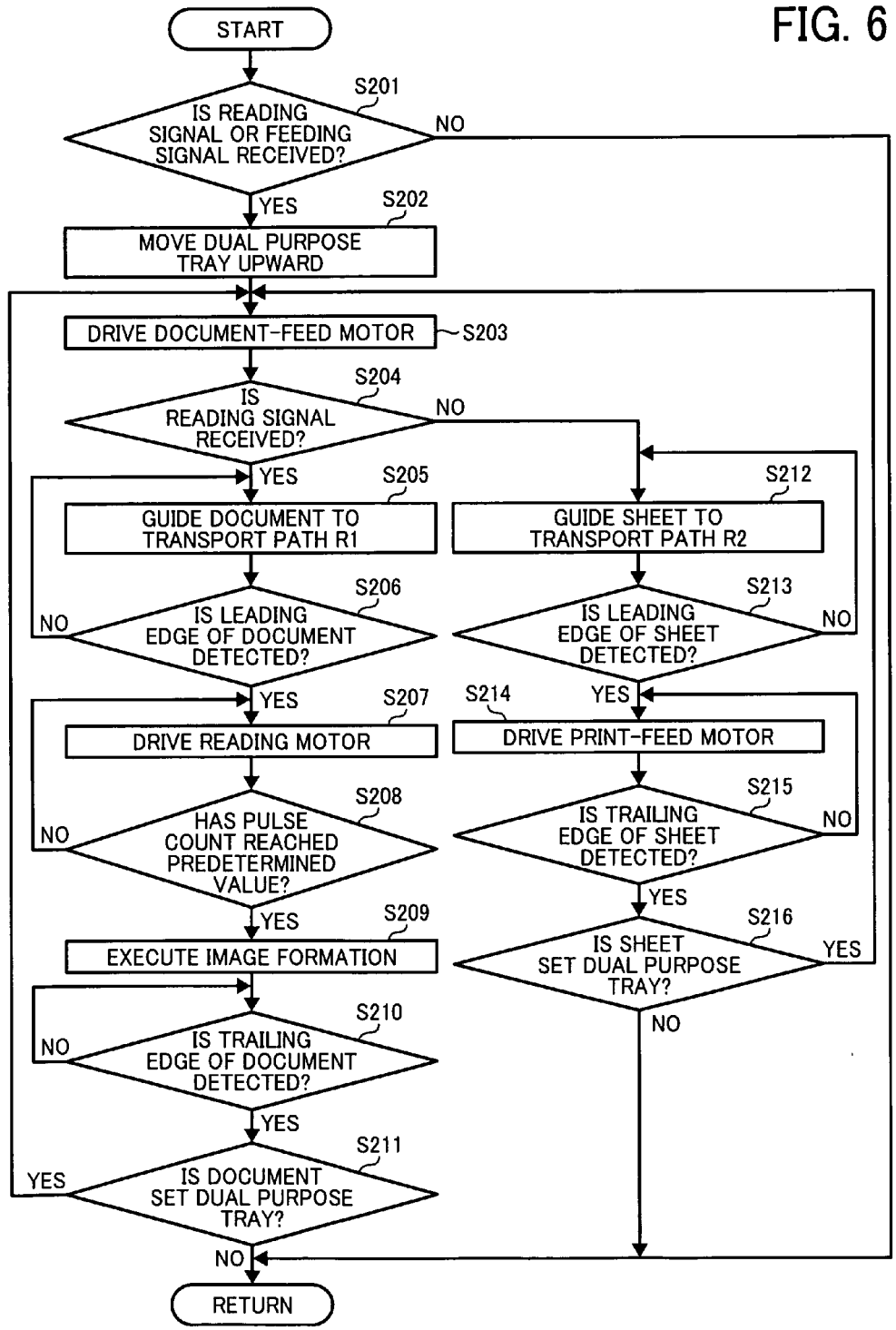
FIG. 6 is a flowchart illustrating a control flow of an ADF and the image reading device in the image forming apparatus shown in FIG. 1.

FIG. 6 is a flowchart illustrating a control flow of the ADF 100 and the image reading device 200 in the image forming apparatus 1. Referring to FIG. 5, the control processing is described below.

Initially, at S201, the controller 101 determines whether or not the reading signal or the feeding signal output from the controller 302 is received. When the controller 101 determines that the reading signal or the feeding signal has been received (YES at S201), the process proceeds to S202. At S202, the controller 101 moves the edge of the lifting board 13 on the dual purpose tray 8 upward, and activates the document feeding motor at S203. Thus, due to the activate operation of the document feeding motor, the document P on the top on the dual purpose tray 8 is picked up and separated from the other documents P stacked under it to be transported.

Subsequently, at S204, the controller 101 determines whether or not the reading signal output from the controller 302 is received. When the controller 101 determines that the reading signal output from the controller 302 is received (YES at S204), the process proceeds to S205. By contrast, when the controller 101 determines that the reading signal output from the controller 302 is not received (NO at S204), the process proceeds to S212.

At S205, the controller 101 guides the document P thus separated and transported to the transport path R1.

For example, when the switching pawl 61 is on the home position, the solenoid is not activated, and the switching pawl 61 keeps the home position. By contrast, when the switching pawl 61 is on the printing position, the solenoid is deactivated, and the switching pawl 61 returns to the home position. By thus setting the switching pawl 61 to the home position, the document P is guided from the transport path R0 to the transport path R2.

Subsequently, at S207, the controller 101 determines whether or not the registration sensor 51 has detected the leading edge of the document P. At that time, when the controller 101 determines that the registration sensor 51 has detected the leading edge of the document P (YES at S206), the process proceeds to S207. By contrast, when the controller 101 determines that the registration sensor 51 has not detected the leading edge of the document P (NO at S206), the process returns to S205.

At S207, the controller 101 activates the reading motor that rotates the first transport roller 14a and the second transport roller 18a.

It is to be noted that, before activating the reading motor, the controller 101 causes the feeding motor to slow to stop the document P in front of the image reading position and outputs a registration stop signal to the image reading device 200. Subsequently, the image reading device 200 sends a reading start signal, and thereby, the controller 101 activates the reading motor and the counts the driving pulse thereof as described above.

Next, at S208, the controller 101 determines whether or not the counted value of the driving pulse of the reading motor has reached a predetermined value. When the controller 101 determines that the pulse count of the reading motor has reached the predetermined value, the process proceeds to S209 (YES at S208). By contrast, when the controller 101 determines that the pulse count of the reading motor has not reached the predetermined value (NO at S208), the process returns to S207.

At S209, the controller 101 executes image reading in conjunction with the image reading device 200. In the image reading, the controller 101 sends a gate signal showing an effective image area on the image reading surface (first surface) of the document P in a sub-scanning direction to the image reading device 200, timed to coincide with the arrival of the leading edge of the document P to the image reading position above the image reading device 200 based on the pulse count of the reading motor. The gate signal is sent until the trailing edge of the document P is passed through the image reading position.

The image reading device 200 emits light to the surface of the document P based on the gate signal (exposure processing) and focuses the reflection light to obtain image data as the image data and stores the image data on the image memory, not shown.

Subsequently, at S210, the controller 101 determines whether or not the registration sensor 51 has detected the trailing edge of the document P. At this time, when the controller determines that the registration sensor 51 has detected the trailing edge of the document P (YES at S210), the process proceeds to S211.

At S211, the controller 101 determines whether or not the document P is set on the dual purpose tray 8. For example, this can be determined based on an output signal of a document set sensor, not shown, that is disposed close to the dual purpose tray 8. At this time, when the controller 101 determines that the document P is on the dual purpose tray 8 (YES at S211), the process returns to S203. By contrast, when the controller 101 determines the document P is not on the dual purpose tray 8 (NO at S210), the control process is finished.

It is to be noted that, after the registration sensor 51 detects the trailing edge of the document P, when a discharging sensor, not shown, has detected the leading edge of the document P from which the image data has been read, the controller 101 activates a discharge motor, not shown, to rotate the discharge roller 19a counterclockwise in FIG. 3 and discharge the document P to the document discharge tray 21.

By contrast, at S212, when the controller 101 determines that the controller 101 has not received the reading signal from the controller 302, namely, the controller 101 receives the feeding signal, the controller 101 guides the transfer sheet P1 transported from the duel purpose tray 8 to the transport path R2. For example, when the switching pawl 61 is at the printing position, the solenoid is kept activated (On state). By contrast, when the switching pawl 61 is on the home position, the solenoid is activated to move the switching pawl 61 to the printing position. Therefore, the transfer sheet P1 is guided from the transport path R0 to the transport path R2.

Subsequently, at S213, the controller 101 determinates whether or not the registration sensor has detected the leading edge of the transfer sheet P1. At this time, when the controller 101 determines that the registration sensor 56 has detected the leading edge of the transfer sheet P1 (YES at S213), the process proceeds to S214. By contrast, when the controller 101 determines that the registration sensor 56 has not detected the leading edge of the transfer sheet P1 (NO at S213), the process returns to S212.

At S214, the controller 101 activates the print feeding motor that is a transport motor, and thus, the third transport roller 41a is rotated counterclockwise in FIG. 1. Then, the transfer sheet P1 enters the nip portion between the third transport roller 41a and the third driven roller 41b and proceeds into the nip portion between the guide rollers 42a and 42b in the image reading device 200.

Subsequently, at S215, the controller 101 determinates whether or not the registration sensor 56 has detected the trailing edge of the transfer sheet P1. At this time, when the controller 101 determines that the registration sensor 56 has detected the trailing edge of the transfer sheet P1 (YES at S215), the process proceeds to S216. By contrast, when the controller 101 determines that the registration sensor 56 has not detected the trailing edge of the transfer sheet P1 (NO at S215), the process returns to S214.

At S216, the controller 101 determinates whether or not the transfer sheet P1 is on the dual purpose tray 8. At this time, when the controller determines that the transfer sheet P1 is on the dual purpose tray 8 (YES at S216), the process proceeds to S203. By contrast, when the controller determines that the transfer sheet P1 is not on the dual purpose tray 8 (NO at S216), the control process is ended.

In the above-described image forming apparatus 1 of the first embodiment, the ADF 100 and the image reading device 200 can be slid by the slide mechanisms 170a and 170b to expose the upper portion of the image forming device 300, thus facilitating cleaning and replacement of the transfer belt 128 located in the upper portion of the image forming device 300.

In the preceding description, the first embodiment is described as having a configuration in which the transport path through which the recording medium is transported is switched between the transport paths R1 and R2 in accordance with the mode information, such as scanning mode, printing mode, and the like that are stored in the memory of the controller 302 in advance.

Alternatively, in addition to or instead of the determination of the operation modes, the transport path can be switched between the transport paths R1 and R2 according to the type of recording medium, the document P or the transfer sheet P1, set on the dual purpose tray 8. For example, a known electronic tag that includes an integrated circuit (IC) chip and a receiving antenna is provided in a predetermined transfer sheet P1, and an IC reader that reads the information stored in the memory of the IC chip by communicating with the electronic tag is provided in the front of the dual purpose tray 8. Then, the controller 101 determines whether the recording medium on the dual purpose tray 8 is the document P or transfer sheet P1 in accordance with recording medium identification information that is stored in the memory of the memory of the IC chip.

In this configuration, when the controller 101 determines that the document P is on the dual purpose tray 8, the document P can be transported to the image reading position through the transport paths R0 and R1. By contrast, when the controller 101 determines that the transfer sheet P1 is on the dual purpose tray 8, the transfer sheet P1 can be transported to the image forming position through the transport paths R0 and R2.

For example, referring to FIG. 6, after the controller 101 receives the reading signal or the feeding signal, and before the document P or the transfer sheet P1 is guided to the transport path R1 or R2, that is, the period between S204 and S205 or the period between S204 and S212, the controller 101 can determine whether the recording medium on the dual tray 8 is the document P or the transfer sheet P1 in accordance with the recording medium identification information. Therefore, disparity between the mode setting by the operation panel 25 and placement of recording medium on the dual purpose tray 8 can be detected, and thus the configuration can prevent malfunctioning of the image forming apparatus.

In the first embodiment, the ADF 100 and the image reading device 200 are stacked up on the image forming device 300 in the image forming apparatus 1. For example, this configuration can reduce the size of the image forming apparatus 1 in the horizontal direction when compared with the example in which the image reading device is adjacent to and level with the ADF.

Additionally, in the image forming apparatus 1, because the transport path R0 bifurcates into the transport paths R1 and R2, and the transfer sheet P1 can be transported through the transport path R2, both the document P and the transfer sheet P1 can be set on the dual purpose tray 8, and thus a single tray can be used for image reading as well as image forming. Therefore, the size of the image forming apparatus can be reduced, and setting space of the image forming apparatus can be used efficiently.

In the first embodiment, as for image reading, the sheet-through reading mode in which the stationary image reading mechanism reads the image data on the document P while the document is transported through the contact glass 2, and the fixed reading mode in which the image reading mechanism moves while reading the image data on the document P that remains motionless on the contact glass 2 can be applicable. Therefore, the image forming apparatus 1 can enhance the image reading function, while using the space therein efficiently.

In the first embodiment, because the image reading device 200 is openable to the image forming device 300, which can facilitate the maintenance work of the image forming device. For example, in the configuration in which the transfer belt 128 is disposed above the image carrier unit so as to transfer the toner image onto the transfer sheet P1, the transfer sheet P1 can be easily removed when the jamming of sheets occurs near the transfer belt 128.

In the image forming apparatus 1 of the first embodiment, because the ADF 100 and the image reading device 200 can be slid in the horizontal direction by the slide mechanisms 170a and 170b, the space to open the image forming device 300 is not required in the vertical direction. Therefore, the user can use space efficiently in the vertical direction.

In the first embodiment, based on the determination of the controller 101, the document P on the dual purpose tray 8 is transported to the image reading position through the transport path R0 and R1, and the document P is transported to the image forming position through the transport path R0 and R2.

This configuration can use the dual purpose tray 8 effectively. Additionally, in the configuration, for example, the error that the image reading mechanism 200 reads the transfer sheet P1 or that the image forming apparatus transfers the toner image onto the document P can be prevented. Therefore, the reliability of the image forming apparatus can be enhanced.

Second Embodiment

An image forming apparatus according to a second embodiment is described below with reference to FIG. 7.

In the second embodiment, an image reading device 200A that is equipped with an automatic document feeder (ADF) 100A is rotatably connected to an image forming device 300A, and both a support frame 134 and a transfer belt 128 are attached to the image reading device 200A, not included in the image forming device 300A. This configuration is different from the first embodiment. It is to be noted that, for ease of explanation and illustration, because other than the difference described above the image forming apparatus 1A has a configuration similar to the configuration of the image forming apparatus 1 in the first embodiment, other components of the image forming apparatus 1A are represented by identical numerals and the description thereof is omitted below.

Figure 7:
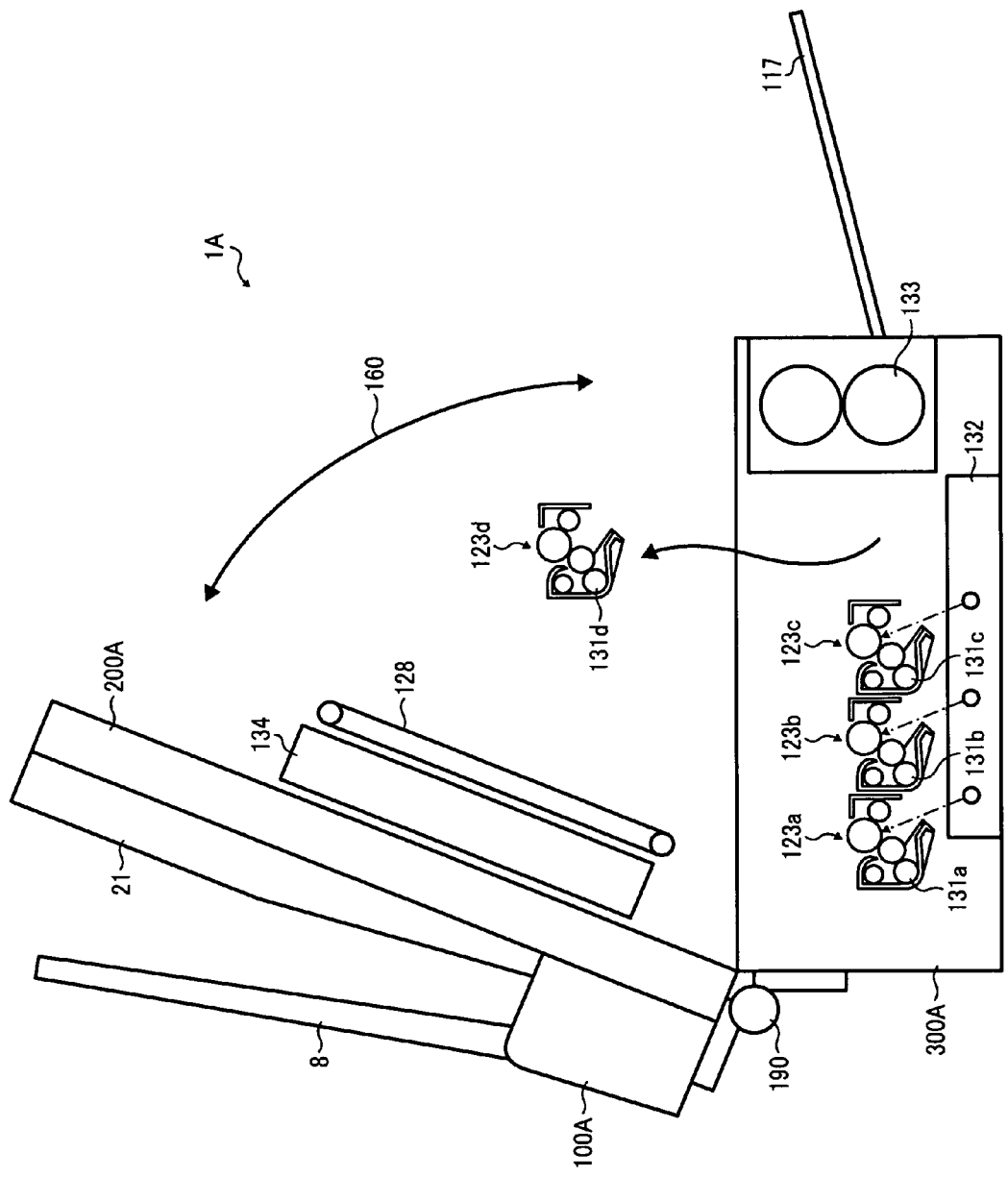
FIG. 7 is a schematic cross-sectional view illustrating a configuration of an image forming apparatus according to another illustrative embodiment of the present invention.

In FIG. 7, the image forming apparatus 1A includes the ADF 100A, the image reading device 200A, and the image forming device 300A. The ADF 100A transports an original document P on the dual purpose tray 8 to an image reading position and transports a transfer sheet P1 on the dual purpose tray 8 into the image reading device 200A. The image reading device 200A reads an image on the document P transported by the ADF 100A. The image forming device 300A that is a main body of the image forming apparatus 1A forms an image on the transfer sheet P1 based on data sent by the image reading device 200A or data sent from an external device.

The image reading device 200A is connected to the image forming device 300A through a connecting device 190, such as a hinge, and pivots together with the ADF 100A upward (indicated by arrow 160) to expose an upper portion of the image forming device 300A. The connecting device 190 serves as a connection rotation mechanism. Further, the supporting frame 134 as well as the transfer belt 128 is fixedly mounted beneath the image reading device 200A, and thus those devices pivot together with the ADF 100A and the image reading device 200A.

Therefore, the image carrier unit 123 that includes photoreceptor drums 122 and the development devices 121 appears when the image forming device 300A is exposed by pivoting the ADF 100A and the image reading device 200A out of the way.

As described above, in the image forming apparatus 1A of the present embodiment, the supporting frame 134 and the transfer belt 128 that is supported by the supporting frame 134 are attached to the bottom of the image reading device 200A, and the one terminal of the image reading device 200A is pivotably connected to the image forming device 300A. Due to this configuration, it is relatively easy to replace and clean the transfer belt 128 and the image carrier unit 123. In particular, because the image carrier unit 123 appears by pivoting the image reading device 200A, inspection and exchange of the image carrier unit 123 are relatively easy.

In the image forming apparatus 1A of the second embodiment, because the image reading device 200A is connected to the image forming device 300A through a connecting device 190, such as a hinge, the space to open the image forming device 300A is not required in the horizontal direction. Therefore, the user can use space efficiently in the horizontal direction.

Further, in the second embodiment, because the transfer belt 128 pivots in conjunction with the image reading device 200A to the image forming device 300A, the image carrier unit 123 that is located beneath the transfer unit 128 appears by pivoting the image reading device 200A. Therefore, it is relatively easy to exchange inspect the components of the image carrier unit 123 such as the photoreceptor drums 122 and the development devices 131, which is suitable for the maintenance work. The transfer belt serves as a transport mechanism, and the image carrier unit 123 that includes photoreceptor drums 122 and the development devices 131 serve as an image carrier mechanism.

Moreover, in the second embodiment, because the image carrier unit including the photoreceptor drums 122 and the development device 131 is detachably attachable to the image forming device 300A, inspection and exchange, etc of the image carrier unit 123 are relatively easy.

Third Embodiment

An image forming apparatus according to a third embodiment is described below with reference to FIG. 8.

In an image forming apparatus 1B, an image reading device 200B that is equipped with an automatic document feeder (ADF) 100B is detachably attached to the image forming device 300B while remaining electrically connected thereto. This configuration is different from that of the image forming apparatus 1 in the first embodiment. It is to be noted that, for ease of explanation and illustration, because other than the difference described above the image forming apparatus 1B has a configuration similar to the configuration of the image forming apparatus 1 in the first embodiment, other components of the image forming apparatus 1B are represented by identical numerals and the description thereof is omitted below.

Figure 8:
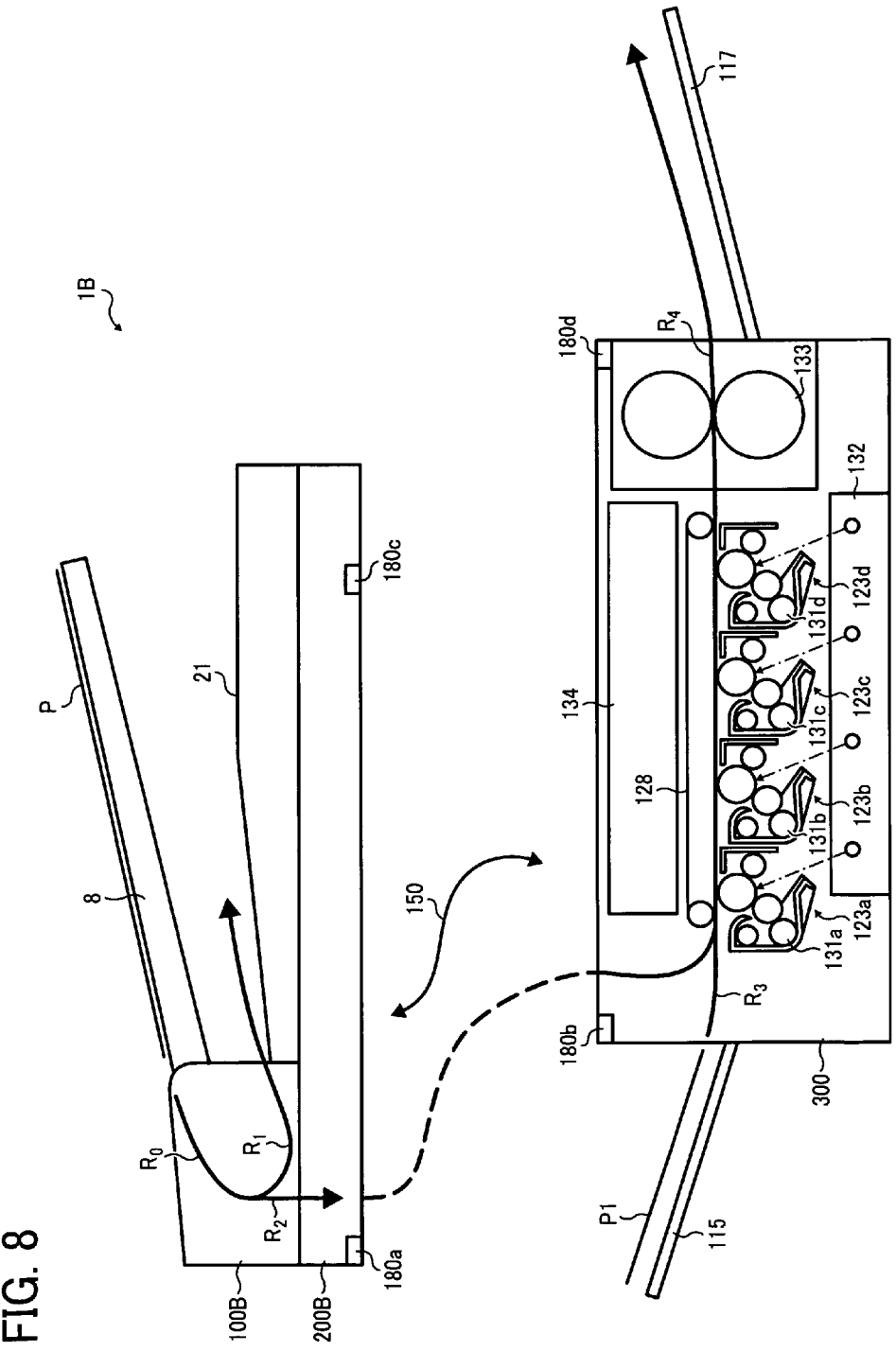
FIG. 8 is diagram illustrating a state of disengagement between an image forming device and an image reading device equipped with an ADF in an image forming apparatus according to another illustrative embodiment of the present invention.

In FIG. 8, the image forming apparatus 1B includes the ADF 100B, the image reading device 200B, and the image forming device 300B. The ADF 100B transports an original document P placed on the dual purpose tray 8 to an image reading position and transports an transfer sheet P1 placed on the dual purpose tray 8 into the image reading device 200B. The image reading device 200B reads an image on the document P transported by the ADF 100B. The image forming device 300B that is a main body of the image forming apparatus 1B forms an image on the transfer sheet P1 based on data sent by the image reading device 200B or data sent from an external device.

The image reading device 200B is detachably attached in a direction indicated by arrow 150 by connection elements 180a, 180b, 180c, and 180d, such as nuts and bolts. By detaching the image reading device 200B from the image forming device 300B and removing a topside cover, not shown, an upper portion of the image forming device 300B is exposed. In FIG. 8, the connection element 180a can connect to the connection element 180b, and the connection element 180c can connect to the connection element 180d. The image forming apparatus 1B further includes four connection elements, although not shown in FIG. 8, besides the connecting elements 180a, 180b, 180c, and 180d. These pairs of connection elements, not shown, can also connect to each other, similarly to the connection elements as shown in FIG. 8.

Referring to FIG. 8, when the image reading device 200B is detached, the transfer sheets set on a manual sheet feeding tray 115 manually are fed to the image forming device 300B. It is to be noted that, because the image forming device 300B is electrically connected to the image reading device 200B by a connection cable, the image forming device 300B can form an image on the transfer sheet P1 based on data sent by the image reading device 200B or data sent from the external device.

As described above, in the image forming apparatus 1B of the present embodiment, because the ADF 100B and the image reading device 200B are disposed separately from the image forming device 300B, the user can clean and replace the device separately as usage conditions require. For example, while image data from the HOST 16 is input to the image forming device 300B and the printing mode is executed, while turning off the ADF 100B and the image reading device 200B, the user can replace the components.

Moreover, it is possible to install only the image forming device 300B at a user's site as a printer, and then later, if necessary, the ADF 100B and the image reading device 200B can be added to the image forming device 300B. Such configuration is user-friendly.

In the third embodiment, because the image reading device 200B is detachably attached to the image forming device 300C, the image reading device 200B and the ADF 100B can be disengaged from the image forming device 300B, and therefore, the layout of the image forming apparatus can be set conveniently for user.

In the third embodiment, because the manual sheet feeding tray 115 is detachably attached to the image forming device 300B, the user can effectively utilize the setting space of the image forming apparatus. Further, in this configuration, when the image reading device 200B that and the ADF 100B equipped therewith are separately located from the image forming device 300B, the image data reading can be performed by using the dual purpose tray 8 as the document tray, and simultaneously, the image data can be formed on the transfer sheet P1 by using the manual sheet feeding tray as the transfer sheet tray.

Fourth Embodiment

An image forming apparatus according to a fourth embodiment is described below with reference to FIG. 9.

In an image forming apparatus 1C, an image reading device 200C that is equipped with an automatic document feeding device (ADF) 100C is detachably attached to an image forming device 300C, and the image reading device 200C that is equipped with the ADF 100C and the image forming device 300C are separately located on a dedicated shelf 250, in an arrangement that is different from that of the first embodiment. It is to be noted that, for ease of explanation and illustration, because other than the difference described above, the image forming apparatus 1C has a configuration similar to the configuration of the image forming apparatus 1 in the first embodiment other components of the image forming apparatus 1C are represented by identical numerals and the description thereof is omitted below.

Figure 9:
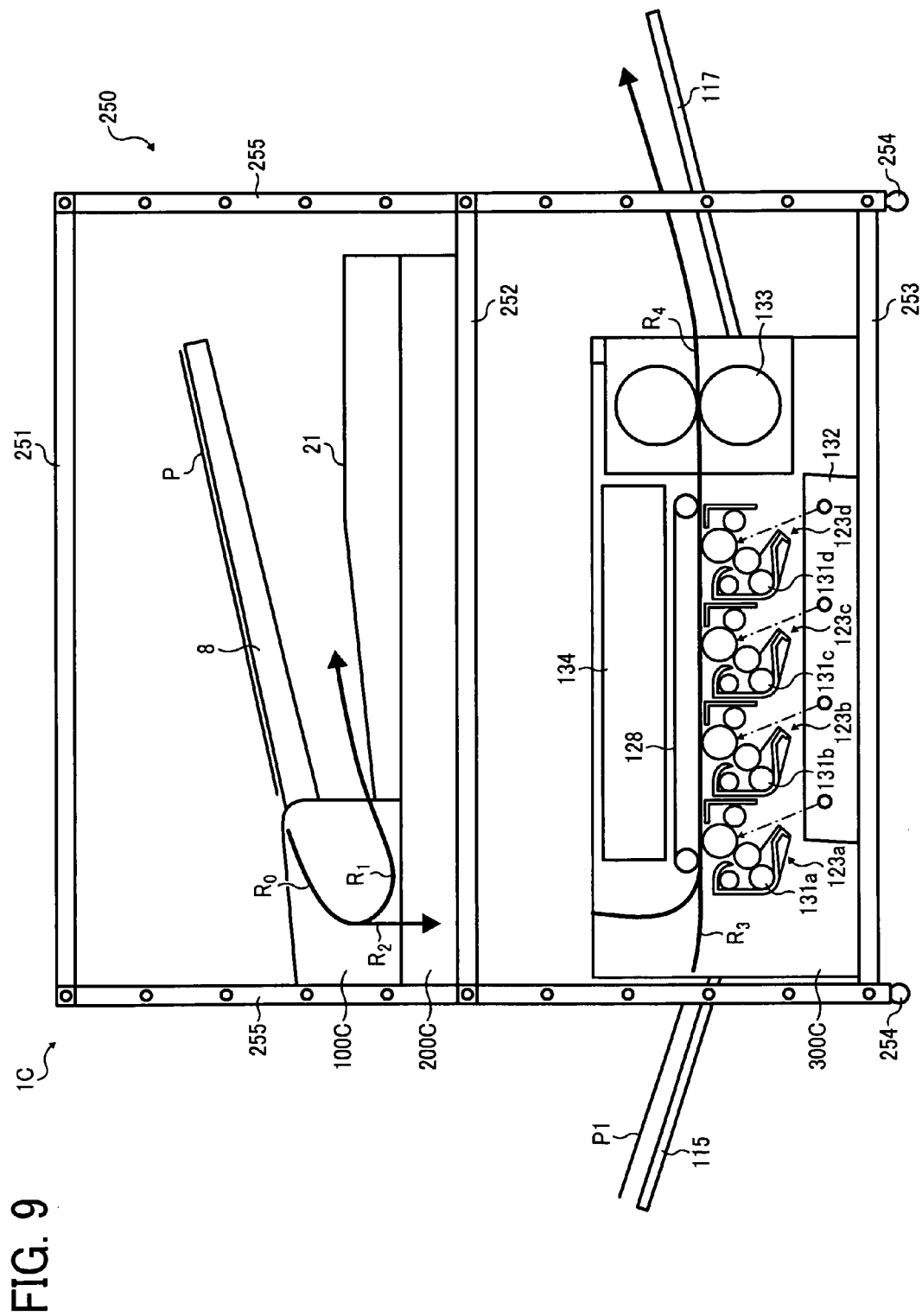
FIG. 9 is diagram illustrating an image forming apparatus according to another illustrative embodiment of the present invention in which an image forming device and an image reading device equipped with an ADF are disposed on separate levels.

In FIG. 9, the image forming apparatus 1C includes the ADF 100C, the image reading device 200C that is equipped with the ADF 100C, and the image forming device 300C. The image reading device 200C that is equipped with the ADF 100C and the image forming device 300 are located on different levels in the dedicated shelf 250. The ADF 100C is rotatably connected to the image reading device 200C by a connecting device such as a hinge. The dedicated shelf 250 includes sufficient space between an upper fixed plate 251 and the dual purpose tray 8 to pivot the image reading device 200C. The image forming device 300C is covered with a topside cover, not shown, and by opening the topside cover, the interior of the image forming device 300C can be exposed.

The dedicated shelf 250 includes the upper fixed plate 251, a lower fixed plate 253, a movable plate 252, and four supporting members 255. The upper fixed plate 251, the lower fixed plate 253, and the movable plate 252 are connected to the four supporting members 255 by a bolt, a nut, and so on. At the bottom of each supporting member 255, a caster that carries the dedicated shelf 250 is disposed.

In the present embodiment, the image forming device 300C is located on the lower fixed plate 253, and the ADF 100C and the image reading device 200C are located on the movable plate 252. It is to be noted that the movable plate 252 is movable in a vertical direction by moving the connection members to different connection holes provided in the supporting member 255 into which the supporting member 255 are insertable. Thus, a distance between the image reading device 200C and the image forming device 300C can be set flexibly by moving the connection position of the movable plate 252.

Further, as described above, when the ADF 100C and the image reading device 200C are used separately from the image forming device 300C, for image reading, the document P is set on the dual purpose tray 8 and is read in the sheet-through reading mode, or the document P is set on the contact glass 3 and is read in the fixed reading mode. At this time, for image formation, the transfer sheet P1 is manually set on the manual sheet feeding tray 115 and fed therefrom.

As described above, in the configuration including the image forming apparatus 1C and the dedicated shelf 250, because the distance between the image forming device 300C and the image reading device 200C can be adjusted in the vertical direction by changing the position of the movable plate 252, the user can use space efficiently in the horizontal direction, and layout of the image forming device and the image reading device can be conveniently set for user.

It is to be noted that the movable plate 252, the supporting members 255, and the connection members correspond to an adjusting member that adjust the distance between the image forming device 300C and the image reading device 200C in the vertical direction.

Although, in the present embodiment, the height of the movable plate 252 is changed by changing connection holes in the supporting member 255 to which the connection members are insertable, alternatively, the movable plate 252 can be configured to slide for a given distance in the vertical direction. In this case, the slide mechanism used in the first embodiment including the slide rail, a wheel or a bearing, and a slide plate that is a supporting member, can be used also as the sliding mechanism for the present embodiment.

In the present configuration, the distance between the image forming device 300C and the image reading device 200C can be flexibly set in the vertical direction.

Further, although, in the above-described configuration shown in FIG. 9, the image reading device 200C and the ADF 100C are connected by the hinge so that the ADF 100C can pivot around the one axis, alternatively, the image reading device 200C and the image forming device 300C are hinged together so that the image reading device 200C can rotate around another axis. Alternatively, multiple axes can be arranged in the ADF 100C so that the ADF 100C can rotate around different axes.

This configuration can facilitate maintenance works of the apparatus. For example, when the transfer sheet or document is jammed during transport, the removal of the document P or the transfer sheet P1 can be facilitated.

Further, in the embodiment shown in FIG. 9, it is described that, when the ADF 100C and the image reading device 200C are located separately from the image forming device 300C, the transfer sheet P is fed from the manual feeding tray. Alternatively, a sheet-feeding tray and a sheet separation mechanism that respectively correspond to the dual purpose tray 8, the pickup roller 9, the lifting board 13, the feeding belt 10, and the separation roller 11 can be provided on the image forming device 300C, and the image forming apparatus can further includes a transport path R5 (not shown) that leads to the image forming position from the feed tray via the sheet separation mechanism.

In the present configuration, because the multiple transfer sheets P1 can be continuously fed from the feed tray by the separation feed mechanism, manual feeding of transfer sheets becomes unnecessary, and therefore, the speed of the operation of the image forming device 300C can increase. Additionally, because image formation can be performed along with reading of image data from the document P, usability becomes enhanced.

It is to be noted that, in an image forming apparatus in which an image forming device is disposed under an image reading device (scanner), a photoreceptor drum is located beneath the scanner, and a transfer-transport belt and a sheet-feeding transport rollers are located beneath the photoreceptor drum, maintenance work is rather complicated. Additionally, in an ADF in which an openable cover is provided on its topside, although a document can be removed by rotating the openable cover when the jamming of sheets occurs in a transport path in the ADF, ease of maintenance works in the image forming device that is equipped with the ADF is not considered.

By contrast, in the above-described various different embodiments of the present invention, the transfer belt 128 and the supporting frame 134 are disposed above the image carrier mechanism 120 including the photoreceptor drums, the development devices, and the like in the image forming device 300, and image reading device 200 can be opened to expose the image forming device 300. Therefore, this configuration facilitates maintenance of the transfer belt. In the second embodiment in particular, because the transfer belt 128 and the supporting frame 134 are attached to the bottom of the image reading device 200 and are rotated with the image reading mechanism 200, the image carrier mechanism as well as the transfer belt 128 can be exposed, which facilitates maintenance of the image carrier mechanism as well as the transport belt 128.

Numerous additional modifications and variations are possible in light of the above teachings. It is therefore to be understood that, within the scope of the appended claims, the disclosure of this patent specification may be practiced otherwise than as specifically described herein.

What is claimed is:

1. An image forming apparatus comprising:
  a dual purpose tray configured to accommodate a document and a transfer sheet;
  a document transport mechanism configured to transport the document placed on the dual purpose tray to an image reading position of the image forming apparatus;
  an image reading mechanism configured to read an image on the document transported to the image reading position by the document transport mechanism, the image reading mechanism being disposed beneath the document transport mechanism;
  an image forming mechanism configured to form the image read by the image reading mechanism on the transfer sheet, the image forming mechanism being disposed beneath the image reading mechanism;
  a transfer sheet transport mechanism configured to transport the transfer sheet from a bifurcation point through the image reading mechanism to an image forming position;
  a sheet feeding path configured to transport both the document and the transfer sheet to the bifurcation point from the dual purpose tray;
  a first transport path configured to transport the document to the image reading position from the bifurcation point;
  a second transport path configured to transport the transfer sheet through the image reading mechanism to an image forming position from the bifurcation point;
  a determination mechanism configured to determine a type of medium set on the dual purpose tray by determining whether the medium set on the dual purpose tray is the document or the transfer sheet, the determination mechanism including an integrated circuit (IC) reader configured to read recording medium identification information embedded in the medium;
  a switching member configured to switch the sheet feeding path between the first transport path and the second transport path at the bifurcation point; and
  a controller configured to,
    determine if a disparity exists between an operating mode of the image forming apparatus, the operating mode being associated with a type of medium, and the type of the medium identified by the reading the recording medium identification information, and
    if the disparity exists, prevent a malfunction of the image forming apparatus by,
    overriding the operation mode of the image forming apparatus to the operation mode associated with the type of medium identified by the reading the recording medium identification information, and
    instructing the switching member to switch the sheet feeding path based on the reading of the recording medium identification information associated with the medium set on the dual purpose tray.

2. The image forming apparatus according to claim 1, wherein the document transport mechanism is attachable to a top portion of the image reading mechanism and openable to a contact glass, and the image reading mechanism reads the image on the document while the document is transported on the contact glass.

3. The image forming apparatus according to claim 1, wherein the document transport mechanism is attachable to a top portion of the image reading mechanism and openable to a contact glass, and the image reading mechanism reads the image on the document that remains stationary on the contact glass while the image reading mechanism moves to read the image on the document.

4. The image forming apparatus according to claim 3, wherein the image reading mechanism is detachably attachable to the image forming mechanism.

5. The image forming apparatus according to claim 4, further comprising:
  a dedicated tray to feed the transfer sheet to the forming mechanism and to be detachably attachable to the image forming apparatus.

6. The image forming apparatus according to claim 5, further comprising
  a detector disposed alongside of the transport path between the dedicated tray and the image forming position, to detect a presence of the transfer sheet.

7. The image forming apparatus according to claim 1, wherein the image reading mechanism can open to the image forming mechanism.

8. The image forming apparatus according to claim 7, further comprising:
a slide connection mechanism to connect the image reading mechanism to the image forming mechanism slidably in a horizontal direction.

9. The image forming apparatus according to claim 7, further comprising:
a rotation connection mechanism to rotatably connect the image reading mechanism to the image forming mechanism.

10. The image forming apparatus according to claim 1, further comprising:
a rotation connection mechanism to rotatably connect the image forming mechanism to the image reading mechanism;
an image carrier to carry a toner image developed based on the image read by the image reading mechanism; and
a transfer mechanism to transfer the toner image to the transfer sheet, disposed facing the image carrier,
wherein the image carrier and the transfer mechanism are exposable by rotation of the rotation connection mechanism.

11. The image forming apparatus according to claim 10, wherein the image carrier is detachably attachable to the image forming mechanism.

12. The image forming apparatus according to claim 1, wherein
the medium is transported to the image reading position via the first transport path when the determination mechanism determines that the medium set on the dual purpose tray is the document, and
the medium is transported to the image forming position via the second transport path when the determination mechanism determines that the medium set on the dual purpose tray is the transfer sheet.

13. The image forming apparatus according to claim 1, further comprising:
a detector disposed alongside of the first transport path, to detect a presence of the document; and
a detector disposed alongside of the second transport path, to detect a presence of the transfer sheet.

14. A control method for the image forming apparatus according to claim 1, comprising the steps of:
determining, whether the medium set on the dual purpose tray is a document or a transfer sheet;
transporting the document to the image reading position via the first transport path when the medium is the document; and
transporting the transfer sheet to the image forming position via the second transport path when the medium is the transfer sheet.

15. A control method for the image forming apparatus according to claim 1, comprising the steps of:
determining whether an operation mode of the image forming apparatus is a scanning mode or a printing mode; and
transporting the document to the image reading position via the first transport path when the operation mode is the scanning mode, or transporting the transfer sheet to the image forming position via the second transport path when the operation mode is the printing mode.

16. The image forming apparatus according to claim 1, wherein the document is a medium having the image to be read, and the transfer sheet is a medium configured to receive the image read by the image reading mechanism.

17. An image forming apparatus comprising:
a dual purpose tray configured to simultaneously accommodate a document and a transfer sheet interleaved in a stack on the dual purpose tray;
a document transport mechanism configured to transport the document placed on the dual purpose tray to an image reading position of the image forming apparatus;
an image reading mechanism configured to read an image on the document transported to the image reading position by the document transport mechanism, the image reading mechanism being disposed beneath the document transport mechanism;
an image forming mechanism configured to form the image read by the image reading mechanism on the transfer sheet, the image forming mechanism being disposed beneath the image reading mechanism;
a transfer sheet transport mechanism configured to transport the transfer sheet from a bifurcation point through the image reading mechanism to an image forming position;
a sheet feeding path configured to transport both the document and the transfer sheet to the bifurcation point from the dual purpose tray;
a first transport path configured to transport the document to the image reading position from the bifurcation point;
a second transport path configured to transport the transfer sheet through the image reading mechanism to an image forming position from the bifurcation point;
a determination mechanism configured to determine a type of medium set on the dual purpose tray by determining whether the medium set on the dual purpose tray is the document or the transfer sheet, the determination mechanism including an integrated circuit (IC) reader configured to read recording medium identification information embedded in the medium;
a switching member configured to switch the sheet feeding path between the first transport path and the second transport path at the bifurcation point; and
a controller configured to,
determine if a disparity exists between an operating mode of the image forming apparatus, the operating mode being associated with a type of medium, and the type of the medium identified by the reading the recording medium identification information, and
if the disparity exists, prevent a malfunction of the image forming apparatus by,
overriding the operation mode of the image forming apparatus to the operation mode associated with the type of medium identified by the reading the recording medium identification information, and
instructing the switching member to switch the sheet feeding path based on the reading of the recording medium identification information associated with the medium set on the dual purpose tray.

18. An image forming apparatus comprising:
a dual purpose tray configured to simultaneously accommodate a document and a transfer sheet interleaved in a stack on the dual purpose tray;
a document transport mechanism configured to transport the document placed on the dual purpose tray to an image reading position of the image forming apparatus;
an image reading mechanism configured to read an image on the document transported to the image reading position by the document transport mechanism, the image reading mechanism being disposed beneath the document transport mechanism;

an image forming mechanism configured to form the image read by the image reading mechanism on the transfer sheet, the image forming mechanism being disposed beneath the image reading mechanism;

a transfer sheet transport mechanism configured to transport the transfer sheet from a bifurcation point through the image reading mechanism to an image forming position;

a sheet feeding path configured to transport both the document and the transfer sheet to the bifurcation point from the dual purpose tray;

a first transport path configured to transport the document to the image reading position from the bifurcation point;

a second transport path configured to transport the transfer sheet through the image reading mechanism to an image forming position from the bifurcation point;

a determination mechanism including an integrated circuit (IC) reader, the IC reader configured to determine a type of medium set on the dual purpose tray by determining whether the medium set on the dual purpose tray is the document or the transfer sheet by reading recording medium identification information embedded in the medium;

a switching member configured to switch the sheet feeding path between the first transport path and the second transport path at the bifurcation point; and a controller configured to, determine if a disparity exists between an operating mode of the image forming apparatus, the operating mode being associated with a type of medium, and the type of the medium identified by the reading the recording medium identification information, and if the disparity exists, prevent a malfunction of the image forming apparatus by, overriding the operation mode of the image forming apparatus to the operation mode associated with the type of medium identified by the reading the recording medium identification information, and instructing the switching member to switch the sheet feeding path based on the reading of the recording medium identification information associated with the medium set on the dual purpose tray.

\* \* \* \* \*